(12) United States Patent
Hasegawa et al.

(10) Patent No.: US 10,590,503 B2
(45) Date of Patent: Mar. 17, 2020

(54) HIGH-STRENGTH GALVANIZED STEEL SHEET AND METHOD FOR MANUFACTURING THE SAME

(71) Applicant: JFE STEEL CORPORATION, Tokyo (JP)

(72) Inventors: Hiroshi Hasegawa, Fukuyama (JP); Shinjiro Kaneko, Chiba (JP); Yoichi Makimizu, Fukuyama (JP); Yoshitsugu Suzuki, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 886 days.

(21) Appl. No.: 15/104,718

(22) PCT Filed: Dec. 16, 2014

(86) PCT No.: PCT/JP2014/006259
§ 371 (c)(1),
(2) Date: Jun. 15, 2016

(87) PCT Pub. No.: WO2015/093043
PCT Pub. Date: Jun. 25, 2015

(65) Prior Publication Data
US 2016/0319385 A1    Nov. 3, 2016

(30) Foreign Application Priority Data
Dec. 18, 2013 (JP) .................. 2013-260988

(51) Int. Cl.
*C22C 38/00* (2006.01)
*C21D 9/46* (2006.01)
*C23C 2/06* (2006.01)
*C22C 38/38* (2006.01)
*C22C 38/58* (2006.01)
*C21D 8/02* (2006.01)
(Continued)

(52) U.S. Cl.
CPC ............. *C21D 9/46* (2013.01); *B32B 15/013* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0278* (2013.01); *C22C 18/04* (2013.01); *C22C 38/00* (2013.01); *C22C 38/001* (2013.01); *C22C 38/002* (2013.01); *C22C 38/005* (2013.01); *C22C 38/02* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/28* (2013.01); *C23C 2/36* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ...... C21D 9/46; C21D 8/0278; C21D 8/0263; C21D 8/0226; C21D 8/0205; C21D 8/0236; C21D 2211/001; C21D 2211/008; C21D 2211/005; C21D 2211/002; C21D 8/0247; C23C 2/36; C23C 2/02; C23C 2/06; C23C 2/40; C23C 2/28; C22C 38/54; C22C 38/50; C22C 38/48; C22C 38/32; C22C 38/28; C22C 38/26; C22C 38/24; C22C 38/22; C22C 38/20; C22C 38/06; C22C 38/02; C22C 38/005; C22C 38/002; C22C 38/001; C22C 38/58; C22C 38/38; C22C 38/00; C22C 18/04; B32B 15/013
USPC ........................................................ 148/320
See application file for complete search history.

(56) References Cited

U.S. PATENT DOCUMENTS
9,290,834 B2    3/2016 Hasegawa et al.
9,458,521 B2    10/2016 Nakagaito et al.
(Continued)

FOREIGN PATENT DOCUMENTS
EP    2138599    12/2009
EP    2578718    4/2013
(Continued)

OTHER PUBLICATIONS

Chang et al. "Austenite films in bainitic microstructures" Materials Science and Technology Sep. 1995 vol. 11, p. 874-881 (Year : 1994).*

(Continued)

*Primary Examiner* — Haytham Soliman
(74) *Attorney, Agent, or Firm* — Ratnerprestia

(57) ABSTRACT

Provided are a high-strength galvanized steel sheet which can preferably be used as a material for automobile parts and a method for manufacturing the steel sheet. The steel sheet has a C content of 0.15% or less, in which an area ratio of ferrite is 10% or less, an area ratio of bainitic ferrite is 2% or more and 30% or less, an area ratio of martensite is 60% or more and 98% or less, an area ratio of retained austenite is less than 2%, an average grain diameter of martensite adjacent to bainite is 15 μm or less, a proportion of massive martensite adjacent only to bainite to the whole metallographic structure is 10% or less, and a value (ΔHv) calculated by subtracting the Vickers hardness at a position located at 20 μm from the surface of the steel sheet from the Vickers hardness at a position located at 100 μm from the surface of the steel sheet is 30 or more.

18 Claims, No Drawings

(51) Int. Cl.

| | |
|---|---|
| *C22C 18/04* | (2006.01) |
| *C23C 2/28* | (2006.01) |
| *C23C 2/40* | (2006.01) |
| *B32B 15/01* | (2006.01) |
| *C22C 38/02* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/48* | (2006.01) |
| *C22C 38/50* | (2006.01) |
| *C22C 38/54* | (2006.01) |
| *C23C 2/02* | (2006.01) |
| *C23C 2/36* | (2006.01) |

(56) References Cited

U.S. PATENT DOCUMENTS

| | | | |
|---|---|---|---|
| 2010/0108200 A1* | 5/2010 | Futamura | C21D 6/001 148/503 |
| 2011/0168300 A1 | 7/2011 | Moulin | |
| 2012/0040203 A1 | 2/2012 | Takagi | |

FOREIGN PATENT DOCUMENTS

| | | |
|---|---|---|
| JP | 2004211140 | 7/2004 |
| JP | 2007009317 | 1/2007 |
| JP | 2010070843 | 4/2010 |
| JP | 2010275600 | 12/2010 |
| JP | 2010275628 | 12/2010 |
| JP | 2011132602 | 7/2011 |
| JP | 2011241430 A | 12/2011 |
| JP | 2012031462 | 2/2012 |
| JP | 2012229466 A | 11/2012 |
| JP | 5136609 B2 | 2/2013 |
| JP | 2013108154 | 6/2013 |
| KR | 20100046057 A | 5/2010 |

OTHER PUBLICATIONS

Korean Decision to Grant for Korean Application No. 10-2016-7019385, dated Nov. 23, 2017, including English translation, 2 pages.

Extended European Search Report dated Oct. 31, 2016 for European Application No. 14871692.1, 5 pages.

International Search Report and Written Opinion of the International Searching Authority issued in related International Application No. PCT/JP2014/006259, dated Feb. 10, 2015. 2015.

\* cited by examiner

HIGH-STRENGTH GALVANIZED STEEL SHEET AND METHOD FOR MANUFACTURING THE SAME

CROSS REFERENCE TO RELATED APPLICATIONS

This is the U.S. National Phase application of PCT International Application No. PCT/JP2014/006259, filed Dec. 16, 2014, and claims priority to Japanese Patent Application No. 2013-260988, filed Dec. 18, 2013, the disclosures of each of these applications being incorporated herein by reference in their entireties for all purposes.

FIELD OF THE INVENTION

The present invention relates to a high-strength galvanized steel sheet excellent in terms of spot weldability, anti-crash property, and bending formability which can preferably be used as an automotive steel sheet and to a method for manufacturing the steel sheet.

BACKGROUND OF THE INVENTION

In order to reduce $CO_2$ emission from the viewpoint of global environment conservation, improving the fuel efficiency of an automobile by reducing the weight of the automobile body while maintaining the strength of the whole automobile body has continuously been an important task in the automobile world.

In order to reduce the weight of an automobile body while maintaining the strength of the whole automobile body, it is effective to reduce the thickness of a steel sheet by increasing the strength of the steel sheet which is used as a material for automobile parts. Here, many of automobile parts are formed by using, for example, a press forming method or a burring method. Therefore, a high-strength steel sheet which is used as a material for automobile parts is required to have not only a desired strength but also excellent formability.

Nowadays, there is a growing trend toward using a high-strength steel sheet of over 1180 MPa grade as a material for the skeleton of an automobile body. Since it is difficult to ordinarily perform conventional press forming on a high-strength steel sheet of over 1180 MPa grade due to its high degree of difficulty of forming, a processing method mainly including bending such as roll forming is used when such a steel sheet is formed. Therefore, bending formability is one of the important properties when steel of over 1180 MPa grade is used.

Also, examples of important properties required for a material for automobile parts include anti-crash property. At the time of an automotive collision, a strain rate applied to automobile parts composed of steel sheets reaches about $10^3$/s. Therefore, automotive parts such as a pillar, a member, and a bumper are required to have sufficient anti-crash property for achieving occupant safety when a collision occurs by some chance while an automobile is traveling. That is, it is necessary to achieve the collision safety of an automobile by manufacturing automobile parts described above by using a high-strength steel sheet having sufficient anti-crash property for excellently absorbing collision energy even in the case where the high strain rate as described above is applied at the time of a collision.

In response to such requirements, for example, Patent Literature 1 discloses a technique regarding a steel sheet of 1180 MPa grade excellent in terms of formability and anti-crash property. Although it is possible to improve formability such as elongation and stretch flange formability according to the technique described in Patent Literature 1, bending formability and spot weldability, which is one of the important properties required for an automotive steel sheet, are not discussed. In addition, in the case of the technique disclosed in Patent Literature 1, since tempering equipment is needed, there is also a problem regarding equipment costs.

Patent Literature 2 discloses a technique regarding a high-strength steel sheet having good bending formability, good spot weldability, and so forth. However, in Patent Literature 2, since anti-crash property is not evaluated, the high-strength steel sheet may not have sufficient anti-crash property. In addition, in Patent Literature 2, there is almost no disclosure regarding a steel sheet with over 1180 MPa tensile strength.

PTL 1: Japanese Unexamined Patent Application Publication No. 2012-031462

PTL 2: Japanese Unexamined Patent Application Publication No. 2011-132602

SUMMARY OF THE PRESENT INVENTION

An aim of the present invention is, by advantageously solving the problems with the conventional techniques described above, to provide a high-strength galvanized steel sheet having a tensile strength (TS) of 1180 MPa or more and excellent spot weldability, anti-crash property, and bending formability which can preferably be used as a material for automobile parts and a method for manufacturing the steel sheet.

The present inventors, in order to manufacture a high-strength steel sheet excellent in terms of, for example, weldability and anti-crash property by solving the problems described above, diligently conducted investigations from the viewpoint of the chemical composition, metallographic structure, and manufacturing method of a steel sheet, and, as a result, found that, by controlling C content to be 0.15% or less, the area ratio of ferrite to be 10% or less, the area ratio of bainitic ferrite to be 2% or more and 30% or less, the area ratio of martensite to be 60% or more and 98% or less, the area ratio of retained austenite to be less than 2%, an average grain diameter of martensite adjacent to bainite to be 15 μm or less, the proportion of massive martensite adjacent only to bainite to the whole metallographic structure to be 10% or less, and a value (ΔHv) calculated by subtracting the Vickers hardness at a position located at 20 μm from the surface of the steel sheet from the Vickers hardness at a position located at 100 μm from the surface of the steel sheet to be 30 or more, it is possible to obtain a high-strength steel sheet having a TS of 1180 MPa or more and excellent spot weldability, anti-crash property, and bending formability. The present invention has been completed on the basis of such findings and provides the following non-limiting embodiments of the invention.

(1) A high-strength galvanized steel sheet excellent in terms of spot weldability, anti-crash property, and bending formability, the steel sheet having a chemical composition containing, by mass %, C: 0.05% or more and 0.15% or less, Si: 0.01% or more and 1.00% or less, Mn: 1.5% or more and 4.0% or less, P: 0.100% or less, S: 0.02% or less, Al: 0.01% or more and 0.50% or less, Cr: 0.010% or more and 2.000% or less, Nb: 0.005% or more and 0.100% or less, Ti: 0.005% or more and 0.100% or less, B: 0.0005% or more and 0.0050% or less, and the balance being Fe and inevitable impurities, in which K, which is expressed by equation (1) below, is 3.0 or more and a metallographic structure including, in terms of area ratio determined by performing structure observation at a position located at ¼ of the thickness in a cross section at a right angle to the surface of the steel sheet, ferrite: 10% or less, bainitic ferrite: 2% or more and 30% or less, and martensite: 60% or more and 98% or less, in which the proportion of retained austenite determined by using an X-ray diffraction method is less than 2%, an average grain diameter of martensite adjacent to bainite is 15 μm or less, the proportion of massive martensite adjacent only to bainite to the whole metallographic structure is 10% or less, and a value (ΔHv) calculated by subtracting the Vickers hardness at a position located at 20 μm from the surface of the steel sheet from the Vickers hardness at a position located at 100 μm from the surface of the steel sheet is 30 or more.

$$K=-0.4\times[Si]+1.0\times[Mn]+1.3\times[Cr]+200\times[B] \quad (1)$$

(In equation (1) above, [Si] denotes the content [mass %] of Si, [Mn] denotes the content [mass %] of Mn, [Cr] denotes the content [mass %] of Cr, and [B] denotes the content [mass %] of B.)

(2) The high-strength galvanized steel sheet excellent in terms of spot weldability, anti-crash property, and bending formability according to item (1), in which the steel sheet has the chemical composition further containing, by mass %, at least one chemical element selected from among Mo: 0.005% or more and 2.000% or less, V: 0.005% or more and 2.000% or less, Ni: 0.005% or more and 2.000% or less, and Cu: 0.005% or more and 2.000% or less.

(3) The high-strength galvanized steel sheet excellent in terms of spot weldability, anti-crash property, and bending formability according to item (1) or (2), in which the steel sheet has the chemical composition further containing, by mass %, at least one chemical element selected from among Ca: 0.001% or more and 0.005% or less and REM: 0.001% or more and 0.005% or less.

(4) The high-strength galvanized steel sheet excellent in terms of spot weldability, anti-crash property, and bending formability according to any one of items (1) to (3), in which the galvanized steel sheet is a galvannealed steel sheet.

(5) A method for manufacturing a high-strength galvanized steel sheet excellent in terms of spot weldability, anti-crash property, and bending formability, the method including a hot rolling process including, when hot-rolling a slab having the chemical composition according to any one of items (1) to (3), performing finish rolling in which a final finish rolling pass is performed with a rolling reduction of 10% or more at a temperature of 850° C. or higher and 950° C. or lower, then performing cooling so that the total retention time in a temperature range of 600° C. or higher and 700° C. or lower is 10 seconds or less, and coiling the cooled steel sheet at a temperature of 450° C. or higher and lower than 600° C., a cold rolling process following the hot rolling process and including cold-rolling the hot-rolled steel sheet with a rolling reduction of more than 20%, an annealing process following the cold rolling process and including heating the cold-rolled steel sheet to an annealing temperature in an atmosphere having a dew point of −45° C. or higher and +20° C. or lower and an air ratio of 0.80 or more at an average heating rate of 0.5° C./s or more in a temperature range of 300° C. or higher and equal to or lower than the annealing temperature, which is a temperature in a temperature range of (Ac3−20° C.) or higher and 950° C. or lower, and holding the heated steel sheet at the annealing temperature for 10 seconds or more and 1000 seconds or less, a cooling process including cooling the annealed cold-rolled steel sheet at an average cooling rate of 5° C./s or more to a cooling stop temperature, which is a temperature in a temperature range of 450° C. or higher and 550° C. or lower, and holding the cooled steel sheet at the cooling stop temperature for 30 seconds or more and 1000 seconds or less, and a galvanizing process including galvanizing the cooled cold-rolled steel sheet.

(6) A method for manufacturing a high-strength galvanized steel sheet excellent in terms of spot weldability, anti-crash property, and bending formability, the method having an alloying process including performing an alloying treatment on the high-strength galvanized steel sheet manufactured by using the method according to item (5).

The high-strength galvanized steel sheet according to aspects of the present invention has a TS of 1180 MPa or more and excellent spot weldability, anti-crash property, and bending formability which are preferable properties for a material for automobile parts. Therefore, the high-strength galvanized steel sheet according to the present invention can preferably be used as a material for automobile parts.

DETAILED DESCRIPTION OF EMBODIMENTS OF THE PRESENT INVENTION

Hereafter, the embodiments of the present invention will be described. Here, the present invention is not limited to the embodiments described below.

In the case of the high-strength galvanized steel sheet according to an embodiment of the present invention, a galvanizing layer is formed on a base steel sheet. In addition, in the case where the galvanized steel sheet is a galvannealed steel sheet, a galvannealing layer may be formed on a base steel sheet. First, the base steel sheet, the galvanizing layer, and the galvannealing layer will be described.

Base Steel Sheet

The base steel sheet of the high-strength galvanized steel sheet according to an embodiment of the present invention has a chemical composition containing, by mass %, C: 0.05% or more and 0.15% or less, Si: 0.01% or more and 1.00% or less, Mn: 1.5% or more and 4.0% or less, P: 0.100% or less, S: 0.02% or less, Al: 0.01% or more and 0.50% or less, Cr: 0.010% or more and 2.000% or less, Nb: 0.005% or more and 0.100% or less, Ti: 0.005% or more and 0.100% or less, B: 0.0005% or more and 0.0050% or less, and the balance being Fe and inevitable impurities, in which K, which is expressed by specific equation (1), is 3.0 or more. The chemical composition will be described hereafter. Here, % refers to mass %.

C: 0.05% or More and 0.15% or Less

C is a chemical element which is important for increasing TS by forming martensite. In the case where the C content is less than 0.05%, since the strength of martensite is low, it is difficult to achieve a TS of 1180 MPa or more. On the other hand, in the case where the C content is more than 0.15%, there is a decrease in bending formability and spot weldability. Therefore, the C content may be set to 0.05% or more and 0.15% or less, or preferably 0.06% or more and 0.12% or less.

Si: 0.01% or More and 1.00% or Less

Si is a chemical element which is effective for increasing the TS of steel through solid solution strengthening. In order to realize such an effect, it is preferable that the Si content be 0.01% or more. On the other hand, in the case where the Si content is more than 1.00%, there is a decrease in zinc coatability and spot weldability. Therefore, the Si content may be set to 0.01% or more and 1.00% or less, preferably 0.01% or more and 0.80% or less, or more preferably 0.01% or more and 0.60% or less.

Mn: 1.5% or More and 4.0% or Less

Mn is a chemical element which increases the TS of steel through solid solution strengthening and which increases YS and TS by forming martensite while inhibiting ferrite transformation and bainite transformation. In order to realize such effects, it is preferable that the Mn content be 1.5% or more. On the other hand, in the case where the Mn content is more than 4.0%, there is a marked increase in the amount of inclusions, which results in a decrease in the cleanliness and anti-crash property of steel. Therefore, the Mn content may be set to 1.5% or more and 4.0% or less, preferably 1.8% or more and 3.5% or less, or more preferably 2.0% or more and 3.0% or less.

P: 0.100% or Less

P decreases spot weldability by decreasing anti-crash property as a result of undergoing grain boundary segregation. Therefore, it is preferable that the P content be as small as possible. From the viewpoint of, for example, manufacturing costs, it is acceptable that the P content be 0.100% or less. Although there is no particular limitation on the lower limit of the P content, since there is a decrease in productivity in the case where the P content is limited to less than 0.001%, it is preferable that the P content be 0.001% or more.

S: 0.02% or Less

S decreases spot weldability as a result of existing in the form of inclusions such as MnS. Therefore, it is preferable that the S content be as small as possible. From the viewpoint of manufacturing costs, it is acceptable that the S content be 0.02% or less. Although there is no particular limitation on the lower limit of the S content, since there is a decrease in productivity in the case where the S content is limited to less than 0.0005%, it is preferable that the S content be 0.0005% or more.

Al: 0.01% or More and 0.50% or Less

Since Al functions as a deoxidation agent, it is preferable that Al be added in a deoxidation process. In order to realize such an effect, it is preferable that the Al content be 0.01% or more. On the other hand, in the case where the Al content is more than 0.50%, there is an increased risk of slab cracking when continuous casting is performed. Therefore, the Al content may be set to 0.01% or more and 0.50% or less.

Cr: 0.010% or More and 2.000% or Less

Cr is a chemical element which increases TS by forming martensite while inhibiting ferrite transformation and bainite transformation. In order to realize such an effect, it is preferable that the Cr content be 0.010% or more. On the other hand, in the case where the Cr content is more than 2.000%, the effect becomes saturated without further increasing, and there is an increase in manufacturing costs. Therefore, the Cr content may be set to 0.010% or more and 2.000% or less, preferably 0.010% or more and 1.500% or less, or more preferably 0.010% or more and 1.000% or less.

Nb: 0.005% or More and 0.100% or Less

Nb is a chemical element which is effective for decreasing a grain diameter by inhibiting the recrystallization of ferrite when annealing is performed. In order to realize such an effect, it is preferable that the Nb content be 0.005% or more. On the other hand, in the case where the Nb content is more than 0.100%, the effect becomes saturated without further increasing, and there is an increase in manufacturing costs. Therefore, the Nb content may be set to 0.005% or more and 0.100% or less, preferably 0.010% or more and 0.080% or less, or more preferably 0.010% or more and 0.060% or less.

Ti: 0.005% or More and 0.100% or Less

Ti is a chemical element which is effective for decreasing a grain diameter by inhibiting the recrystallization of ferrite when annealing is performed. In order to realize such an effect, it is preferable that the Ti content be 0.005% or more. On the other hand, in the case where the Ti content is more than 0.100%, the effect becomes saturated without further increasing, and there is an increase in manufacturing costs. Therefore, the Ti content may be set to 0.005% or more and 0.100% or less, preferably 0.010% or more and 0.080% or less, or more preferably 0.010% or more and 0.060% or less.

B: 0.0005% or More and 0.0050% or Less

B is a chemical element which is effective for forming martensite by inhibiting the nucleation of ferrite and bainite originating from grain boundaries. In order to sufficiently realize such an effect, it is important that the B content be 0.0005% or more. On the other hand, in the case where the B content is more than 0.0050%, the effect becomes saturated without further increasing, and there is an increase in manufacturing costs. Therefore, the B content may be set to 0.0005% or more and 0.0050% or less, preferably 0.0015% or more and 0.0050% or less, or more preferably 0.0020% or more and 0.0050% or less.

$K \geq 3.0$

K is expressed by equation (1), that is, $K=-0.4\times[Si]+1.0\times[Mn]+1.3\times[Cr]+200\times[B]$. K is an empirical formula used as an index to control the proportion of massive martensite adjacent only to bainite to the whole metallographic structure to be 10% or less in order to maintain linkages between martensite grains in a microstructure. In the case where K is less than 3.0, since there is an increase in the amount of massive martensite adjacent only to bainite, there is a decrease in bending formability. Therefore, K may be set to 3.0 or more, or preferably 3.2 or more. Here, in equation (1) above, [Si] denotes the content [mass %] of Si, [Mn] denotes the content [mass %] of Mn, [Cr] denotes the content [mass %] of Cr, and [B] denotes the content [mass %] of B.

Fe and Inevitable Impurities

The remaining constituent chemical elements are Fe and inevitable impurities. The chemical elements described above are important constituent chemical elements of the base steel sheet of the high-strength galvanized steel sheet. In the present invention, the following optional constituent chemical elements may be added to the base steel sheet.

At least one selected from among Mo: 0.005% or more and 2.000% or less, V: 0.005% or more and 2.000% or less, Ni: 0.005% or more and 2.000% or less, and Cu: 0.005% or more and 2.000% or less Mo, V, Ni, and Cu are chemical elements which contribute to increasing strength by forming low-temperature-transformation phases such as martensite. In order to realize such an effect, it is preferable that the content of at least one chemical element selected from among Mo, V, Ni, and Cu be 0.005% or more. On the other hand, in the case where the content of any one of Mo, V, Ni, and Cu is more than 2.000%, the effect becomes saturated without increasing, and there is an increase in manufacturing costs. Therefore, the content of each of Mo, V, Ni, and Cu is preferably set to be 0.005% or more and 2.000% or less.

At least one selected from among Ca: 0.001% or more and 0.005% or less and REM: 0.001% or more and 0.005% or less Ca and REM are chemical elements which are effective for increasing workability through controlling the shape of sulfides. In order to realize such an effect, it is preferable that the content of at least one chemical element selected from among Ca and REM be 0.001% or more. On the other hand, in the case where the content of any one of Ca and REM is more than 0.005%, since there is a negative effect on the cleanliness of steel, there may be a decrease in material properties. Therefore, the content of each of Ca and REM may be set to 0.001% or more and 0.005% or less.

Hereafter, non-limiting metallographic structures of the base steel sheet will be described. In an embodiment of the present invention, the metallographic structure (also referred to as "microstructure") of the base steel sheet includes, in terms of area ratio determined by performing structure observation at a position located at ¼ of the thickness in a cross section at a right angle to the surface of the steel sheet, ferrite: 10% or less, bainitic ferrite: 2% or more and 30% or less, and martensite: 60% or more and 98% or less, in which the proportion of retained austenite determined by using an X-ray diffraction method is less than 2%, in which an average grain diameter of martensite adjacent to bainite is 15 μm or less, and in which the proportion of massive martensite adjacent only to bainite to the whole metallographic structure is 10% or less, and a value (ΔHv) calculated by subtracting the Vickers hardness at a position located at 20 μm from the surface of the steel sheet from the Vickers hardness at a position located at 100 μm from the surface of the steel sheet is 30 or more. The reasons for the limitations on the above-mentioned properties are as follows.

Area Ratio of Ferrite: 10% or Less

In the case where the area ratio of ferrite is more than 10%, it is difficult to achieve a TS of 1180 MPa or more and satisfactory anti-crash property at the same time. Therefore, the area ratio of ferrite may be set to 10% or less, preferably 5% or less, or more preferably 2% or less.

Area Ratio of Bainitic Ferrite: 2% or More and 30% or Less

Bainitic ferrite is effective for increasing the bending formability of steel without markedly decreasing strength or anti-crash property. In the case where the area ratio of bainitic ferrite is less than 2%, it is difficult to sufficiently realize such an effect. On the other hand, in the case where the area ratio of bainitic ferrite is more than 30%, it is difficult to achieve a TS of 1180 MPa or more. Therefore, the area ratio of bainitic ferrite may be set to 2% or more and 30% or less, preferably 5% or more and 30% or less, or more preferably 10% or more and 25% or less.

Area Ratio of Martensite: 60% or More and 98% or Less

In the case where the area ratio of martensite is less than 60%, it is difficult to achieve a TS of 1180 MPa or more and satisfactory anti-crash property at the same time. On the other hand, in the case where the area ratio of martensite is more than 98%, there is a decrease in bending formability. Therefore, the area ratio of martensite may be set to 60% or more and 98% or less, preferably 70% or more and 95% or less, or more preferably 70% or more and 90% or less.

Area Ratio of Retained Austenite: Less Than 2%

Retained austenite transforms into martensite, which is much harder than other phases, after processing has been performed. Therefore, since retained austenite tends to be the origin of a crack or the path of crack propagation when dynamic deformation occurs in a steel sheet at the time of, for example, an automotive collision, it is preferable that the amount of retained austenite be small. In the case where the area ratio of retained austenite is 2% or more, there is a decrease in anti-crash property. Therefore, the area ratio of retained austenite may be set to be less than 2%, or preferably less than 1%.

Average Grain Diameter of Massive Martensite Adjacent to Bainite: 15 μm or Less

In aspects of the present invention, it is important to decrease the grain diameter of massive martensite adjacent to bainite in order to achieve satisfactory anti-crash property. Although the mechanism of such an achievement is not clear, it is thought to be as follows. Since bainite has lower strength than martensite, it is thought that bainite tends to be the origin or propagation path of a crack when dynamic deformation occurs in a steel sheet at the time of, for example, an automotive collision. In the case where there is a decrease in the grain diameter of massive martensite adjacent to bainite, it is thought that, since there is an increase in the number of propagation paths of a crack which originates from bainite or reaches bainite, there is an increase in the amount of collision energy being able to be absorbed due to the dispersion of collision energy. In the case where the average grain diameter of massive martensite adjacent to bainite is more than 15 μm, it is difficult to sufficiently achieve the anti-crash property described above. Therefore, the average grain diameter of massive martensite adjacent to bainite may be set to 15 μm or less, or preferably 10 μm or less. Although there is no particular limitation on the lower limit of the average grain diameter, the average grain diameter described above may be about 1 μm or more.

Proportion of Massive Martensite Adjacent Only to Bainite to the Whole Metallographic Structure: 10% or Less In the case of a metallographic structure including mainly martensite as is the case with aspects of the present invention, isolated massive martensite adjacent only to bainite causes a decrease in bending formability. Although the mechanism of such a decrease is not clear, such a decrease is thought to be, for example, caused by microcracks which tend to originate from the interface between bainite and martensite due to non-uniform stress distribution. In the case where the proportion (proportion calculated from area ratio) of massive martensite adjacent only to bainite is more than 10%, it is difficult to achieve sufficient bending formability. Therefore, the proportion of massive martensite adjacent only to bainite to the whole metallographic structure may be set to 10% or less, preferably 5% or less, or more preferably 3% or less. Here, the meaning of "massive martensite" described above includes prior-austenite grain boundaries but does not include island martensite which is isolated in one bainitic ferrite. In addition, in the present invention, "bainite" refers to a metallographic structure including bainitic ferrite and island martensite or carbides having the same orientation.

Value (ΔHv) calculated by subtracting the Vickers hardness at a position located at 20 μm from the surface of the steel sheet from the Vickers hardness at a position located at 100 μm from the surface of the steel sheet: 30 or more In the case where ΔHv, which is the difference ($Hv_{100} - Hv_{20}$) between the Vickers hardness ($Hv_{100}$) at a position located at 100 μm from the surface of the steel sheet and the Vickers hardness ($Hv_{20}$) at a position located at 20 μm from the surface of the steel sheet, is less than 30, there is a decrease in bending formability. Although the mechanism of such a decrease is not clear, it is thought to be as follows. When bending work is performed, a crack begins to be recognizable when the crack propagates to a depth of about 100 μm from the surface of a steel sheet. Therefore, in order to inhibit a microcrack from occurring, it is thought to be important to control not only the average properties of a steel sheet but also the properties within 100 μm of the surface of the steel sheet. When bending work is performed, there is a strain gradient from the surface of a steel sheet toward the center. It is thought that, by providing a strength counter-gradient (in which strength is small at the surface where strain is large) in the vicinity of the surface of the steel sheet in advance, the growth and propagation of a crack is inhibited. By indicating such a strength gradient by ΔHv described above, and by controlling ΔHv to be 30 or more, there is an increase in bending formability. Although there is no particular limitation on the upper limit of ΔHv, the ΔHv described above is about 100 or less in aspects of the present invention.

Here, there is a case where pearlite is included as a phase other than ferrite, bainitic ferrite, martensite, and retained austenite. As long as the conditions regarding a microstructure described above are satisfied, an aim of aspects of the present invention is achieved.

"Area ratio" described above refers to the proportion of the area of each phase to the observed area. The area ratio of each phase was defined as an average value of the area ratios in three fields of view which were obtained by polishing a cross section at a right angle to the surface of a steel sheet, then by etching the polished cross section by using a 3%-nital solution, by observing the position located at ¼ of the thickness by using a SEM (scanning electron microscope) at a magnification of 1500 times in order to obtain the photographs of three fields of view, and by deriving the area ratio of each phase from the obtained image data by using Image-Pro manufactured by Media Cybernetics, Inc. In the image data described above, ferrite appears as a black area, bainitic ferrite appears as a black area including island martensite or a gray area including carbides, and martensite appears as a white area distinctly.

In addition, a method for determining the area ratio of retained austenite is as follows. By polishing a steel sheet to a position located at ¼ of the thickness, by further polishing the polished surface by 0.1 mm by using a chemical polishing method, by determining the integrated intensities of the (200), (220), and (311) planes of fcc iron and the (200), (211), and (220) planes of bcc iron by using an X-ray diffractometer with the Kα-line of Mo, and by obtaining the intensity ratio of the integrated reflection intensity of each plane of fcc iron to that of bcc iron, the area ratio of retained austenite is defined as the obtained intensity ratio.

In addition, the average grain diameter of martensite adjacent to bainite is defined as the average area of martensite raised to the power of ½ (equivalent to the side of a square (square-equivalent method)), where the average area of martensite is obtained by using the image data used for determining the area ratio of each phase as described above and by dividing the total area of the relevant martensite grains in the field of view by the number of the relevant martensite grains in the field of view. Here, a "relevant martensite grain" refers to a grain surrounded by prior-austenite grain boundaries or grain boundaries with other phases with packet or block boundaries being not included.

Galvanizing Layer and Galvannealing Layer

A galvanizing layer is a layer containing mainly Zn. A "galvannealing layer" refers to a layer containing mainly Fe—Zn alloy formed as a result of Fe in steel diffusing into a galvanizing layer through an alloying reaction.

A galvanizing layer and a galvannealing layer may contain Fe, Al, Sb, Pb, Bi, Mg, Ca, Be, Ti, Cu, Ni, Co, Cr, Mn, P, B, Sn, Zr, Hf, Sr, V, Se, and REM in addition to Zn as long as the effect of the present invention is not significantly decreased.

Method for Manufacturing a High-Strength Galvanized Steel Sheet

Hereafter, regarding the method for manufacturing the high-strength galvanized steel sheet according to aspects of the present invention, the preferable method and the preferable conditions will be described. The preferable method for manufacturing the high-strength galvanized steel sheet according to aspects of the present invention includes a hot rolling process, a cold rolling process, an annealing process, a cooling process, and a galvanizing process. These processes will be described hereafter.

Hot Rolling Process

The hot rolling process may be a process including performing finish rolling on a slab under the condition that a final finish rolling pass is performed with a rolling reduction of 10% or more at a temperature of 850° C. or higher and 950° C. or lower, then performing cooling so that the total retention time in a temperature range of 600° C. or higher and 700° C. or lower is 10 seconds or less, and coiling the cooled steel sheet at a temperature of 450° C. or higher and lower than 600° C.

First, manufacturing of a slab used in a hot rolling process will be described. A slab having the chemical composition of the base steel sheet described above may be manufactured. It is preferable that the slab be manufactured by using a continuous casting method in order to prevent macro segregation. Here, a slab may be manufactured by using a method such as an ingot-making method or a thin-slab-casting method other than a continuous casting method. For example, in the case of an ingot-making method, a slab may be manufactured by preparing molten steel, by casting the molten steel, and by then performing slabbing.

Subsequently, the slab described above may be subjected to hot rolling. Before hot rolling is performed on a slab, the slab may be first cooled to room temperature and then reheated, or the slab may be charged into a heating furnace without cooling the slab to room temperature. Optionally, an energy-saving process, in which hot rolling may be performed immediately after having performed heat retention for a little while, may be used. In the case where a slab is heated, it is preferable that the slab be heated to a temperature of 1100° C. or higher in order to dissolve carbides and to prevent rolling load from increasing. In addition, it is preferable that the slab heating temperature be 1300° C. or lower in order to prevent scale loss from increasing.

When the slab is subjected to hot rolling, a sheet bar, which is prepared by performing rough rolling on the slab, may be heated in order to decrease the slab heating temperature and to prevent problems from occurring when hot rolling is performed. In addition, a so-called continuous rolling process, in which finish rolling is continuously performed by joining sheet bars, may be used.

In aspects of the present invention, it is important to control the conditions of a finish rolling process and processes following the finish rolling process in a hot rolling process. Specifically, finish rolling may be performed under the conditions that a final finish rolling pass is performed with a rolling reduction of 10% or more at a temperature (finish rolling temperature) of 850° C. or higher and 950° C. or lower. In addition, cooling may be performed after finish rolling has been performed so that the total retention time in a temperature range of 600° C. or higher and 700° C. or lower is 10 seconds or less, and then coiling is performed at a temperature of 450° C. or higher and lower than 600° C.

In the finish rolling process of hot rolling, in the case where the final finish rolling pass is performed with a rolling reduction of less than 10%, since hardness difference ΔHv in the vicinity of the surface of the steel sheet after annealing has been performed is less than 30, there is a decrease in bending formability. Although the mechanism of such a decrease in hardness difference is not clear, this is thought to be because, since there is coarsening of the metallographic structure in the vicinity of the surface of the hot-rolled steel sheet in the case where there is a decrease in the rolling reduction of finish rolling, a decrease in the concentration of carbon in the vicinity of the surface is inhibited due to a decrease in the number of diffusion paths of oxygen. Therefore, the rolling reduction of the final finish rolling pass of finish rolling may be set to 10% or more. In addition, it is preferable that the rolling reduction described above be 50% or less in order to inhibit an increase in the number of elongated grains.

In the case where final finish rolling pass is performed at a finish rolling temperature of lower than 850° C., there is a decrease in bending formability. This is thought to be because, since elongated grains are retained in the vicinity of the surface of the steel sheet in the case where there is a decrease in the finish rolling temperature, strain is concentrated in such a portion when bending work is performed. On the other hand, in the case where the finish rolling temperature is higher than 950° C., since there is an increase in grain diameter, it is difficult to achieve the microstructure according to aspects of the present invention. Therefore the finish rolling temperature of the final finish rolling pass may be set to 850° C. or higher and 950° C. or lower.

After finish rolling has been performed, in the case where the retention time in a temperature range of 600° C. or higher and 700° C. or lower is more than 10 seconds, since there is a decrease in the amount of a solid solute B in steel due to the formation of B-containing compounds such as B carbides, it is difficult to achieve the metallographic structure according to aspects of the present invention due to a decrease in the effect of B when annealing is performed. Therefore, the total retention time in a temperature range of 600° C. or higher and 700° C. or lower may be set to 10 seconds or less, or preferably 8 seconds or less.

In the case where the coiling temperature is 600° C. or higher, since there is a decrease in the amount of a solid solute B in steel due to the formation of B-containing compounds such as B carbides, it is difficult to achieve the metallographic structure according to aspects the present invention due to a decrease in the effect of B when annealing is performed. On the other hand, in the case where the coiling temperature is lower than 450° C., since a decrease in the concentration of carbon in the vicinity of the surface is inhibited because the introduction of oxygen into the surface layer of the steel sheet is inhibited, there is a decrease in bending formability because the hardness difference $\Delta Hv$ in the vicinity of the surface after annealing has been performed is less than 30. Therefore, the coiling temperature may be set to 450° C. or higher and lower than 600° C., or preferably 500° C. or higher and lower than 600° C.

In addition, it is preferable that the coiled hot-rolled steel sheet be used in the cold rolling process described below after the scale of the steel sheet has been removed by performing, for example, pickling.

Cold Rolling Process

The cold rolling process is a process following the hot rolling process and includes cold-rolling the hot-rolled steel sheet with a rolling reduction of, e.g., more than 20%. In the case where the rolling reduction is 20% or less, since coarse grains are formed, there is a decrease in anti-crash property. Therefore, the rolling reduction of cold rolling may be set to more than 20%, or preferably 30% or more. Here, although there is no particular limitation on the upper limit of the rolling reduction, it is preferable that the upper limit be about 90% or less from the viewpoint of, for example, shape stability.

Annealing Process

The annealing process is a process including, e.g., heating the cold-rolled steel sheet to an annealing temperature in an atmosphere having a dew point of −45° C. or higher and +20° C. or lower and an air ratio of 0.80 or more at an average heating rate of 0.5° C./s or more in a temperature range of 300° C. or higher and equal to or lower than the annealing temperature, which is a temperature in a temperature range of (Ac3−20° C.) or higher and 950° C. or lower, and holding the heated steel sheet at the annealing temperature for 10 seconds or more and 1000 seconds or less.

In the case where the dew point in a temperature range of 300° C. or higher and equal to or lower than an annealing temperature is lower than −45° C., since a decrease in the concentration of carbon in the vicinity of the surface is inhibited because an insufficient amount of oxygen is introduced into the surface layer of the steel sheet, there is a decrease in bending formability because the hardness difference $\Delta Hv$ in the vicinity of the surface after annealing has been performed is less than 30. On the other hand, in the case where the dew point is higher than +20° C., there is a decrease in zinc coatability. Therefore, the dew point in a temperature range of 300° C. or higher and equal to or lower than an annealing temperature may be set to −45° C. or higher and +20° C. or lower, preferably −40° C. or higher and 0° C. or lower, or more preferably −40° C. or higher and −10° C. or lower.

In the case where the air ratio in a temperature range of 300° C. or higher and equal to or lower than an annealing temperature is less than 0.80, since a decrease in the concentration of carbon in the vicinity of the surface is inhibited because an insufficient amount of oxygen is introduced into the surface layer of the steel sheet, there is a decrease in bending formability because the hardness difference $\Delta Hv$ in the vicinity of the surface after annealing has been performed is less than 30. Therefore, the air ratio in a temperature range of 300° C. or higher and equal to or lower than an annealing temperature may be set to 0.80 or more, preferably 0.90 or more, or more preferably 1.00 or more. Although there is no particular limitation on the upper limit of the air ratio, since there is a decrease in productivity in the case where the air ratio described above is more than 1.50, it is preferable that the air ratio described above be 1.50 or less. Here, "air ratio" refers to the ratio of the amount of air to that of a fuel such as a coke oven gas (COG), which is a by-product gas from a steel plant. In addition, although there is no particular limitation on what kind of oxidation furnace is used to perform the oxidation treatment, it is preferable that a direct-fired heating furnace having direct fire burners be used. "Direct fire burner" refers to a burner used to heat a steel sheet in such a manner that burner flames, which are produced by burning the mixture of a fuel such as a coke oven gas (COG), which is a by-product gas from a steel plant, and air come into direct contact with the surface of the steel sheet. For example, a COG or a liquefied natural gas (LNG) may be used as the fuel of a direct fire burner.

In the case where the average heating rate in a temperature range of 300° C. or higher and equal to or lower than an annealing temperature is less than 0.5° C./s, since there is coarsening of austenite, it is difficult to achieve the microstructure according to aspects of the present invention. Therefore, the average heating rate in a temperature range of 300° C. or higher and equal to or lower than an annealing temperature may be set to be 0.5° C./s or more. In addition, it is preferable that the average heating rate described above be 50° C./s or less in order to achieve uniformity in grain diameter.

In the case where the annealing temperature is lower than (Ac3−20° C.), since an insufficient amount of austenite is formed, it is difficult to achieve the microstructure according to aspects of the present invention due to an excessive amount of ferrite formed. On the other hand, in the case where the annealing temperature is higher than 950° C., since there is an increase in the grain diameter of austenite, it is difficult to achieve the microstructure according to aspects of the present invention. Therefore, the annealing temperature may be set to a temperature in a temperature range of (Ac3−20° C.) or higher and 950° C. or lower, preferably (Ac$_3$−10° C.) or higher and 900° C. or lower, or more preferably Ac3 or higher and 880° C. or lower.

Here, temperature Ac$_3$ is derived by using the equation below.

$$Ac_3(° C.)=910-203\times[C]^{0.5}+44.7\times[Si]-30\times[Mn]-11\times[Cr]$$

Here, [C], [Si], [Mn], and [Cr] denote respectively the contents expressed in units of mass % of the corresponding chemical elements in steel.

In the case where the holding time at the annealing temperature is less than 10 seconds, since an insufficient amount of austenite is formed, it is difficult to achieve the microstructure according to aspects of the present invention due to an excessive amount of ferrite formed. On the other hand, in the case where the holding time described above is more than 1000 seconds, since there is an increase in the grain diameter of austenite, it is difficult to achieve the microstructure according to aspects of the present invention. Therefore, the holding time may be set to 10 seconds or more and 1000 seconds or less, or preferably 30 seconds or more and 600 seconds or less.

Cooling Process

The cooling process is a process following the annealing process and includes, e.g., cooling the annealed cold-rolled steel sheet to a cooling stop temperature at an average cooling rate of 5° C./s or more, which is a temperature in a temperature range of 450° C. or higher and 550° C. or lower, and holding the cooled steel sheet at the cooling stop temperature for 30 seconds or more and 1000 seconds or less.

In the case where the average cooling rate is less than 5° C./s, since excessive amounts of ferrite and bainite are formed during cooling, it is difficult to achieve the microstructure according to aspects of the present invention. Therefore, the average cooling rate may be set to 5° C./s or more. In addition, it is preferable that the average cooling rate described above be 50° C./s or less in order to achieve the uniformity in grain diameter.

In the case where the cooling stop temperature is lower than 450° C., since an excessive amount of bainite is formed, it is difficult to achieve the microstructure according to aspects of the present invention. On the other hand, in the case where the cooling stop temperature is higher than 550° C., since an excessive amount of ferrite is formed, it is difficult to achieve the microstructure according to aspects of the present invention. Therefore, the cooling stop temperature may be set to 450° C. or higher and 550° C. or lower.

In the case where the holding time is less than 30 seconds, since bainite is not formed, it is difficult to achieve the microstructure according to aspects of the present invention. On the other hand, in the case where the holding time is more than 1000 seconds, since an excessive amount of bainite is formed, it is difficult to achieve the microstructure according to aspects of the present invention. Therefore, the holding time is set to be 30 seconds or more and 1000 seconds or less, or preferably 30 seconds or more and 500 seconds or less.

Galvanizing Process

The galvanizing process is a process following the cooling process and includes, e.g., galvanizing the cooled cold-rolled steel sheet. It is preferable that an galvanizing treatment be performed by dipping the steel sheet obtained as described above in a galvanizing bath having a temperature of 440° C. or higher and 500° C. or lower and then by controlling a coating weight by using, for example, a gas wiping method. Here, in the galvanizing treatment, it is preferable to use a galvanizing bath having an Al content of 0.08% to 0.18%.

Alloying Treatment

The high-strength galvanized steel sheets according to aspects of the present invention may be a galvannealed steel sheet. In this case, the high-strength galvanized steel sheets according to aspects of the present invention are manufactured by using a method including a hot rolling process, a cold rolling process, an annealing process, a cooling process, a galvanizing process, and a galvannealing process. Since the hot rolling process, the cold rolling process, the annealing process, the cooling process, and the galvanizing process are as described above, the description of these processes are omitted.

In an alloying process for an alloying treatment, it is preferable that the alloying treatment be performed by holding the high-strength galvanized steel sheet in a temperature range of 460° C. or higher and 580° C. or lower for 1 second or more and 40 seconds or less.

Other Treatments

The steel sheet which has been subjected to a galvanizing treatment, and, optionally, to an alloying treatment may be subjected to skin pass rolling in order to, for example, correct the shape thereof and control the surface roughness thereof. However, in the case where the rolling reduction of skin pass rolling is more than 0.5%, there may be a decrease in bending formability due to an increase in hardness in the vicinity of the surface. Therefore, it is preferable that the skin pass rolling reduction (the rolling reduction of skin pass rolling) be 0.5% or less, or more preferably 0.3% or less. In addition, after a galvanizing process, and, optionally, a galvannealing process have been performed, various coating treatments such as resin coating and oil and fat coating may be performed.

EXAMPLES OF EMBODIMENTS OF THE PRESENT INVENTION

Non-limiting, exemplary molten steels having the chemical compositions given in Table 1 were manufactured by using a vacuum melting furnace, and by casting the molten steels, and then performing slabbing, steel slabs were obtained (in Table 1, N is an inevitable impurity). By heating these steel slabs to a temperature of 1200° C., and then by performing rough rolling, finish rolling, and coiling, hot-rolled steel sheets were obtained (hot rolling conditions are given in Tables 2 and 3). Subsequently, by performing cold rolling to a thickness of 1.4 mm, cold-rolled steel sheets were obtained (rolling reductions are given in Tables 2 and 3). Subsequently, the cold-rolled steel sheets were subjected to annealing. By performing annealing in a laboratory under the conditions given in Tables 2 and 3 in order to simulate annealing in a continuous galvanizing line, galvanized steel sheets and galvannealed steel sheets 1 through 42 were obtained. The galvanized steel sheets were manufactured by dipping the steel sheets in a galvanizing bath having a temperature of 460° C. in order to form coating layers having a coating weight of 35 g/m² to 45 g/m² on the surface of the steel sheets, and by then cooling the coated steel sheets at a cooling rate of 10° C./s. In addition, the galvannealed steel sheets were manufactured by performing an alloying treatment on the galvanized steel sheets at a temperature of 530° C., and by then cooling the treated steel sheets at a cooling rate of 10° C./s. The obtained steel sheets were subjects to skin pass rolling with a rolling reduction of 0.3%.

Subsequently, the microstructure of the base steel sheets of the galvanized steel sheets and the galvannealed steel sheets were observed by using the methods described above. The results are given in Tables 4 and 5.

In addition, surface hardness, tensile properties, bending formability, spot weldability, and impact energy absorption capability were determined by using the testing methods below.

<Hardness Test>

By using a test piece having a width of 10 mm and a length of 15 mm taken from a vertical cross section parallel to the rolling direction, a Vickers hardness test was performed at positions located at 20 μm and 100 μm from the surface layer of the steel sheet. After determining hardness at five points at each of the positions in the thickness direction with a test load of 50 g, the Vickers hardness Hv at the position was defined as the average value of the Vickers hardness Hv of the three points other than the points where the maximum value and the minimum value were determined.

<Tensile Test>

YS and TS were determined by performing a tensile test on a JIS No. 5 tensile test piece (JIS Z 2201) taken in a direction at a right angle to the rolling direction of the steel sheet with a strain rate of $10^3$/s in accordance with the prescription in JIS Z 2241. YS was defined as 0.20-proof stress.

<Bending Test>

A bending test was performed on a strip-type test piece having a width of 35 mm and a length of 100 mm taken from the steel sheet so that the direction of the bending axis in the test was parallel to the rolling direction. By performing a 90°-V-bend test with a stroke speed of 10 mm/s, a pressing load of 10 tons, a press holding time of 5 seconds, and a bending radius R of 1.5 mm, and by observing the ridge line at the bending position by using a loupe at a magnification of 10 times, a case where a crack of 1 mm or more was recognized was judged as poor, and a case where only a crack of less than 1 mm was recognized was judged as excellent.

<Spot Weldability Test>

The test was performed by using electrode DR6mm-40R with a pressing load of 4802 N (490 kgf), an initial pressing time of 30 cycles/60 Hz, an energizing time of 17 cycles/60 Hz, and a holding time of 1 cycle/60 Hz. The test current was varied at intervals of 0.2 kA in a current range from 4.6 kA to 10.0 kA and at intervals of 0.5 kA in a current range from 10.0 kA to a welding point for each steel sheet number. Each test piece was subjected to a cross tensile test and the nugget diameter of the welded part of each test piece was determined. The cross tensile test of a resistance spot welded joint was performed in accordance with the prescription in JIS Z 3137. The nugget diameter was determined in accordance with the prescription in JIS Z 3139 as described hereafter. A symmetrical circular plug formed by performing resistance spot welding was halved along the cross section extending in a direction at a right angle to the surface of the steel sheet and almost including the center of the weld by using an appropriate cutting method. By polishing and etching the cut surface, and by performing cross-section microstructure observation by using an optical microscope, the nugget diameter was determined. Here, the nugget diameter was defined as the maximum diameter of the weld zone excluding a corona bond. By performing a cross tensile test on the welded sample having a nugget diameter of 4 $t^{1/2}$ (mm) or more (t: the thickness of the steel sheet), a case where fracturing occurred in the base metal was judged as excellent, and a case where fracturing occurred in the nugget was judged as poor.

<Impact Tensile Test>

Impact energy absorption capability (anti-crash property) was evaluated by taking a tensile test piece having a parallel portion with a width of 5 mm and a length of 7 mm so that the tensile direction in the test was a direction at a right angle to the rolling direction, by performing a tensile test with a strain rate of 2000/s using an impact tensile tester utilizing a Hopkinson bar method, and by determining the absorbed energy (AE) until the strain was 5% (refer to The Iron and Steel Institute of Japan: "Tetsu-to-Hagane", vol. 83 (1997), No. 11, pp. 748-753). Here, the absorbed energy (AE) described above was derived by integrating the stress with respect to the strain from 0% to 5% along the stress-true strain curve. The results obtained as described above are given in Tables 4 and 5.

TABLE 1

| Steel | Chemical Composition (mass %) | | | | | | | | | | | | Ac3 | K | Note |
| | C | Si | Mn | P | S | Al | N | Cr | Ti | Nb | B | Other | | | |
|---|---|---|---|---|---|---|---|---|---|---|---|---|---|---|---|
| A | 0.09 | 0.5 | 2.5 | 0.020 | 0.002 | 0.032 | 0.004 | 0.590 | 0.021 | 0.040 | 0.0028 | — | 790 | 3.6 | within Preferred Scope of Invention |
| B | 0.06 | 0.7 | 2.9 | 0.015 | 0.003 | 0.033 | 0.003 | 0.630 | 0.020 | 0.045 | 0.0036 | — | 798 | 4.2 | within Preferred Scope of Invention |
| C | 0.12 | 0.3 | 2.2 | 0.020 | 0.002 | 0.015 | 0.003 | 0.850 | 0.019 | 0.037 | 0.0022 | — | 778 | 3.6 | within Preferred Scope of Invention |
| D | 0.09 | 0.3 | 2.4 | 0.027 | 0.001 | 0.040 | 0.003 | 0.660 | 0.051 | 0.026 | 0.0039 | — | 783 | 3.9 | within Preferred Scope of Invention |
| E | 0.12 | 0.3 | 2.5 | 0.012 | 0.005 | 0.028 | 0.002 | 0.600 | 0.079 | 0.011 | 0.0031 | — | 771 | 3.8 | within Preferred Scope of Invention |
| F | 0.10 | 0.4 | 2.5 | 0.005 | 0.003 | 0.033 | 0.003 | 0.450 | 0.020 | 0.041 | 0.0028 | Mo:0.1 | 784 | 3.5 | within Preferred Scope of Invention |
| G | 0.12 | 0.5 | 2.2 | 0.003 | 0.002 | 0.039 | 0.004 | 0.560 | 0.015 | 0.040 | 0.0029 | V:0.05 | 790 | 3.3 | within Preferred Scope of Invention |
| H | 0.10 | 0.1 | 2.3 | 0.021 | 0.002 | 0.044 | 0.003 | 0.550 | 0.054 | 0.044 | 0.0035 | Ni:0.5 | 775 | 3.7 | within Preferred Scope of Invention |
| I | 0.08 | 0.1 | 3.0 | 0.013 | 0.003 | 0.025 | 0.003 | 0.610 | 0.021 | 0.034 | 0.0026 | Cu:0.2 | 760 | 4.3 | within Preferred Scope of Invention |
| J | 0.09 | 0.2 | 2.7 | 0.016 | 0.003 | 0.036 | 0.005 | 0.600 | 0.020 | 0.041 | 0.0030 | Ca:0.001 | 770 | 4.0 | within Preferred Scope of Invention |
| K | 0.09 | 0.4 | 2.3 | 0.012 | 0.002 | 0.024 | 0.001 | 0.730 | 0.008 | 0.043 | 0.0023 | REM:0.002 | 790 | 3.5 | within Preferred Scope of Invention |
| L | 0.03 | 0.4 | 2.6 | 0.006 | 0.004 | 0.025 | 0.003 | 0.550 | 0.021 | 0.038 | 0.0030 | — | 809 | 3.8 | out of Preferred Scope of Invention |
| M | 0.18 | 0.5 | 2.6 | 0.010 | 0.003 | 0.032 | 0.004 | 0.600 | 0.020 | 0.039 | 0.0028 | — | 762 | 3.7 | out of Preferred Scope of Invention |
| N | 0.11 | 0.3 | 1.4 | 0.011 | 0.002 | 0.035 | 0.002 | 0.810 | 0.015 | 0.042 | 0.0035 | — | 805 | 3.0 | out of Preferred Scope of Invention |
| O | 0.07 | 0.1 | 2.8 | 0.014 | 0.002 | 0.035 | 0.003 | 0.005 | 0.018 | 0.041 | 0.0034 | — | 777 | 3.4 | out of Preferred Scope of Invention |
| P | 0.08 | 0.5 | 2.4 | 0.013 | 0.002 | 0.029 | 0.003 | 0.580 | 0.001 | 0.035 | 0.0033 | — | 797 | 3.6 | out of Preferred Scope of Invention |

TABLE 1-continued

| | Chemical Composition (mass %) | | | | | | | | | | | | | |
|---|---|---|---|---|---|---|---|---|---|---|---|---|---|---|
| Steel | C | Si | Mn | P | S | Al | N | Cr | Ti | Nb | B | Other | Ac3 | K Note |
| Q | 0.09 | 0.3 | 2.7 | 0.018 | 0.003 | 0.041 | 0.002 | 0.510 | 0.016 | <u>0.003</u> | 0.0027 | — | 776 | 3.8 out of Preferred Scope of Invention |
| R | 0.09 | 0.2 | 2.1 | 0.015 | 0.002 | 0.041 | 0.002 | 0.750 | 0.019 | 0.040 | <u>0.0002</u> | — | 787 | 3.0 out of Preferred Scope of Invention |
| S | 0.12 | 0.8 | 2.3 | 0.022 | 0.003 | 0.041 | 0.002 | 0.350 | 0.019 | 0.040 | 0.0020 | — | 803 | <u>2.8</u> out of Preferred Scope of Invention |
| T | 0.08 | 0.3 | 1.9 | 0.018 | 0.003 | 0.035 | 0.003 | 0.430 | 0.023 | 0.033 | 0.0025 | — | 804 | <u>2.8</u> out of Preferred Scope of Invention |

TABLE 2

| Steel Sheet No. | Steel | Hot Rolling Condition - Finish Rolling - Final Pass Rolling Reduction (%) | Hot Rolling Condition - Finish Rolling Temperature (°C) | Hot Rolling Condition - Retention Time in Range from 600°C to 700°C (s) | Hot Rolling Condition - Coiling Temperature (°C) | Cold Rolling Condition - Cold Rolling Reduction (%) | Annealing Condition - Dew Point (°C) | Annealing Condition - Air Ratio | Annealing Condition - Average Heating Rate (°C/s) | Annealing Condition - Annealing Temperature (°C) | Annealing Condition - Annealing Holding Time (s) | Annealing Condition - Average Cooling Rate (°C/s) | Annealing Condition - Cooling Stop Temperature (°C) | Annealing Condition - Holding Time (s) | Coating Condition* | Note |
|---|---|---|---|---|---|---|---|---|---|---|---|---|---|---|---|---|
| 1 | A | 15 | 900 | 2 | 560 | 50 | −30 | 1.09 | 3.1 | 860 | 200 | 5 | 500 | 60 | GA | Example |
| 2 | | 20 | 870 | 2 | 580 | 50 | −33 | 1.00 | 6.5 | 830 | 150 | 8 | 480 | 100 | GI | Example |
| 3 | | 8 | 870 | 2 | 550 | 50 | −42 | 1.00 | 3.2 | 850 | 150 | 8 | 500 | 80 | GA | Comparative Example |
| 4 | | 15 | 800 | 2 | 550 | 50 | −39 | 1.01 | 3.2 | 850 | 150 | 8 | 500 | 80 | GA | Comparative Example |
| 5 | | 15 | 870 | 12 | 550 | 50 | −35 | 1.02 | 3.2 | 850 | 150 | 8 | 500 | 80 | GA | Comparative Example |
| 6 | | 15 | 870 | 2 | 620 | 50 | −31 | 1.00 | 3.2 | 820 | 150 | 8 | 500 | 80 | GA | Comparative Example |
| 7 | | 15 | 870 | 1 | 500 | 10 | −32 | 1.05 | 3.3 | 850 | 150 | 8 | 500 | 80 | GA | Comparative Example |
| 8 | | 15 | 870 | 1 | 500 | 50 | −48 | 1.00 | 3.2 | 850 | 150 | 8 | 500 | 80 | GA | Comparative Example |
| 9 | | 15 | 870 | 1 | 550 | 50 | −33 | 0.79 | 3.2 | 850 | 150 | 8 | 500 | 80 | GA | Comparative Example |
| 10 | | 15 | 870 | 1 | 550 | 50 | −35 | 1.02 | 0.1 | 850 | 150 | 8 | 500 | 80 | GA | Comparative Example |
| 11 | | 15 | 870 | 2 | 550 | 50 | −37 | 1.01 | 3.5 | 765 | 150 | 8 | 500 | 80 | GA | Comparative Example |
| 12 | | 15 | 870 | 2 | 550 | 50 | −32 | 1.04 | 3.5 | 960 | 150 | 8 | 500 | 50 | GA | Comparative Example |
| 13 | | 15 | 870 | 1 | 550 | 50 | −31 | 1.00 | 3.5 | 810 | 5 | 8 | 500 | 50 | GA | Comparative Example |
| 14 | | 15 | 870 | 2 | 550 | 50 | −34 | 1.06 | 3.5 | 850 | 1200 | 8 | 500 | 50 | GA | Comparative Example |
| 15 | B | 15 | 890 | 1 | 550 | 65 | −28 | 1.00 | 2.5 | 870 | 100 | 15 | 500 | 100 | GA | Example |
| 16 | | 15 | 890 | 1 | 550 | 65 | −34 | 1.00 | 2.5 | 870 | 100 | 15 | 390 | 100 | GA | Comparative Example |
| 17 | | 15 | 890 | 1 | 550 | 65 | −36 | 1.01 | 2.5 | 870 | 100 | 15 | 500 | 1200 | GA | Comparative Example |
| 18 | | 15 | 890 | 1 | 550 | 60 | −34 | 1.00 | 2.5 | 870 | 100 | 15 | 500 | 5 | GA | Comparative Example |
| 19 | C | 15 | 930 | 5 | 500 | 60 | −37 | 1.10 | 12 | 820 | 90 | 12 | 500 | 80 | GI | Example |
| 20 | | 15 | 930 | 5 | 500 | 60 | −34 | 1.02 | 12 | 820 | 90 | 12 | 620 | 80 | GI | Comparative Example |
| 21 | | 15 | 930 | 5 | 500 | 60 | −39 | 1.05 | 12 | 820 | 90 | 4 | 500 | 80 | GI | Comparative Example |

*GI: galvanized steel sheet, GA: galvannealed steel sheet

TABLE 3

| Steel Sheet No. | Steel | Hot Rolling Condition - Finish Rolling - Final Pass Rolling Reduction (%) | Hot Rolling Condition - Finish Rolling Temperature (° C.) | Hot Rolling Condition - Retention Time in Range from 600° C. to 700° C. (s) | Hot Rolling Condition - Coiling Temperature (° C.) | Cold Rolling Condition - Cold Rolling Reduction (%) | Cold Rolling Condition - Dew Point (° C.) | Cold Rolling Condition - Air Ratio | Annealing Condition - Average Heating Rate (° C./s) | Annealing Condition - Annealing Temperature (° C.) | Annealing Condition - Annealing Holding Time (s) | Annealing Condition - Average Cooling Rate (° C./s) | Annealing Condition - Cooling Stop Temperature (° C.) | Annealing Condition - Holding Time (s) | Coating Condition* | Note |
|---|---|---|---|---|---|---|---|---|---|---|---|---|---|---|---|---|
| 22 | D | 25 | 900 | 1 | 470 | 55 | −33 | 1.02 | 2.2 | 850 | 200 | 10 | 470 | 80 | GA | Example |
| 23 | | 25 | 960 | 1 | 470 | 55 | −31 | 1.03 | 2.2 | 850 | 200 | 10 | 500 | 80 | GA | Comparative Example |
| 24 | | 25 | 900 | 1 | 470 | 55 | −48 | 1.02 | 2.2 | 850 | 200 | 10 | 500 | 80 | GA | Comparative Example |
| 25 | E | 25 | 880 | 2 | 540 | 60 | −33 | 1.01 | 1.5 | 830 | 200 | 30 | 460 | 30 | GI | Example |
| 26 | | 25 | 880 | 2 | 540 | 60 | −46 | 0.78 | 1.5 | 830 | 200 | 30 | 460 | 30 | GI | Comparative Example |
| 27 | | 25 | 880 | 2 | 540 | 60 | −40 | 0.75 | 1.5 | 830 | 200 | 30 | 460 | 30 | GI | Comparative Example |
| 28 | F | 18 | 880 | 2 | 500 | 50 | −38 | 1.00 | 3.9 | 850 | 200 | 10 | 500 | 150 | GA | Example |
| 29 | G | 18 | 880 | 2 | 520 | 50 | −34 | 1.02 | 4.0 | 850 | 200 | 10 | 500 | 80 | GA | Example |
| 30 | H | 18 | 880 | 2 | 500 | 40 | −35 | 1.00 | 4.0 | 900 | 200 | 10 | 500 | 100 | GI | Example |
| 31 | I | 18 | 880 | 2 | 560 | 40 | −33 | 1.03 | 4.0 | 800 | 300 | 10 | 480 | 100 | GA | Example |
| 32 | J | 18 | 880 | 2 | 500 | 50 | −31 | 1.00 | 4.0 | 820 | 300 | 10 | 530 | 100 | GI | Example |
| 33 | K | 18 | 880 | 2 | 500 | 55 | −38 | 1.08 | 4.0 | 840 | 100 | 10 | 540 | 100 | GI | Example |
| 34 | L | 18 | 880 | 2 | 500 | 55 | −35 | 1.01 | 4.0 | 850 | 150 | 25 | 460 | 30 | GI | Comparative Example |
| 35 | M | 18 | 880 | 2 | 500 | 55 | −29 | 1.10 | 4.0 | 850 | 150 | 10 | 500 | 150 | GA | Comparative Example |
| 36 | N | 18 | 880 | 2 | 500 | 55 | −35 | 1.01 | 4.0 | 830 | 150 | 10 | 500 | 100 | GA | Comparative Example |
| 37 | O | 18 | 880 | 2 | 500 | 55 | −33 | 1.00 | 4.0 | 800 | 150 | 10 | 500 | 100 | GI | Comparative Example |
| 38 | P | 18 | 880 | 2 | 500 | 55 | −33 | 1.00 | 4.0 | 850 | 150 | 10 | 500 | 100 | GI | Comparative Example |
| 39 | Q | 18 | 880 | 2 | 500 | 55 | −35 | 1.01 | 4.0 | 830 | 150 | 15 | 500 | 100 | GI | Comparative Example |
| 40 | R | 18 | 880 | 2 | 500 | 55 | −36 | 1.04 | 4.0 | 830 | 150 | 15 | 500 | 100 | GA | Comparative Example |
| 41 | S | 18 | 880 | 2 | 500 | 55 | −35 | 1.00 | 4.0 | 860 | 150 | 15 | 500 | 30 | GA | Comparative Example |
| 42 | T | 18 | 880 | 2 | 500 | 55 | −35 | 1.01 | 4.0 | 810 | 150 | 15 | 500 | 30 | GA | Comparative Example |

*GI: galvanized steel sheet, GA: galvannealed steel sheet

TABLE 4

| Steel Sheet No. | *Microstructure V(F) (%) | V(B) (%) | V(M) (%) | V(γ) (%) | Other (%) | d(Mb) (μm) | V(LM) (%) | *Hardness ΔHv | Tensile Property YS (MPa) | TS (MPa) | Absorbed Energy for Strain up to 5% AE (MJ/m3) | AE/TS (J/m3·Pa) | Spot Weldability | Bendability | Note |
|---|---|---|---|---|---|---|---|---|---|---|---|---|---|---|---|
| 1 | 0 | 8 | 92 | 0 | 0 | 6.5 | 0 | 53 | 918 | 1210 | 74 | 0.061 | Excellent | Excellent | Example |
| 2 | 0 | 23 | 77 | 0 | 0 | 5.1 | 2 | 33 | 891 | 1188 | 69 | 0.058 | Excellent | Excellent | Example |
| 3 | 0 | 7 | 93 | 0 | 0 | 6.1 | 0 | 23 | 930 | 1222 | 75 | 0.061 | Excellent | Poor | Comparative example |
| 4 | 0 | 9 | 91 | 0 | 0 | 6.4 | 0 | 25 | 915 | 1219 | 73 | 0.060 | Excellent | Poor | Comparative example |
| 5 | 2 | 43 | 55 | 0 | 0 | 7.0 | 18 | 36 | 785 | 1126 | 54 | 0.048 | Excellent | Poor | Comparative example |
| 6 | 14 | 44 | 42 | 0 | 0 | 6.6 | 26 | 48 | 739 | 1114 | 46 | 0.041 | Excellent | Excellent | Comparative example |
| 7 | 0 | 10 | 90 | 0 | 0 | 17 | 0 | 44 | 909 | 1218 | 58 | 0.048 | Excellent | Excellent | Comparative example |
| 8 | 0 | 9 | 91 | 0 | 0 | 6.7 | 0 | 11 | 911 | 1220 | 72 | 0.059 | Excellent | Poor | Comparative example |
| 9 | 0 | 9 | 91 | 0 | 0 | 6.8 | 0 | 15 | 908 | 1221 | 72 | 0.059 | Excellent | Poor | Comparative example |
| 10 | 0 | 8 | 92 | 0 | 0 | 17 | 0 | 37 | 854 | 1206 | 57 | 0.047 | Excellent | Poor | Comparative example |
| 11 | 12 | 29 | 59 | 0 | 0 | 3.8 | 21 | 35 | 796 | 1135 | 56 | 0.049 | Excellent | Poor | Comparative example |
| 12 | 0 | 7 | 93 | 0 | 0 | 26 | 0 | 43 | 843 | 1202 | 50 | 0.042 | Excellent | Poor | Comparative example |
| 13 | 15 | 51 | 34 | 0 | 0 | 2.5 | 11 | 40 | 795 | 1108 | 59 | 0.053 | Excellent | Excellent | Comparative example |
| 14 | 0 | 9 | 91 | 0 | 0 | 16 | 0 | 43 | 860 | 1208 | 59 | 0.049 | Excellent | Poor | Comparative example |
| 15 | 0 | 6 | 94 | 0 | 0 | 6.2 | 0 | 45 | 993 | 1195 | 86 | 0.072 | Excellent | Excellent | Example |
| 16 | 0 | 50 | 47 | 3 | 0 | 5.9 | 23 | 37 | 822 | 1098 | 54 | 0.049 | Excellent | Excellent | Comparative example |
| 17 | 0 | 46 | 53 | 1 | 0 | 6.0 | 18 | 38 | 769 | 1092 | 51 | 0.047 | Excellent | Excellent | Comparative example |
| 18 | 0 | 1 | 99 | 0 | 0 | 6.0 | 0 | 34 | 1018 | 1012 | 90 | 0.074 | Excellent | Poor | Comparative example |
| 19 | 0 | 26 | 74 | 0 | 0 | 5.7 | 5 | 46 | 913 | 1240 | 69 | 0.056 | Excellent | Excellent | Example |
| 20 | 33 | 1 | 66 | 0 | 0 | 5.6 | 0 | 39 | 753 | 1160 | 43 | 0.037 | Excellent | Poor | Comparative example |
| 21 | 15 | 25 | 60 | 0 | 0 | 5.1 | 12 | 38 | 776 | 1139 | 49 | 0.043 | Excellent | Poor | Comparative example |

*V(F): area ratio of ferrite, V(B): area ratio of bainitic ferrite V(M): area ratio of martensite, V(γ): area ratio of retained austenite, Other: area ratio of phases other than those described above, d(Mb): average grain diameter of martensite adjacent to bainite, V(LM): area ratio of martensite adjacent only to bainite
ΔHv: a value calculated by subtracting the Vickers hardness at a position located at 20 μm from the surface of the steel sheet from the Vickers hardness at a position located at 100 μm from the surface of the steel sheet

TABLE 5

| Steel Sheet No. | *Microstructure V(F) (%) | V(B) (%) | V(M) (%) | V(γ) (%) | Other (%) | d(Mb) (μm) | V(LM) (%) | *Hardness ΔHv | Tensile Property YS (MPa) | TS (MPa) | Absorbed Energy for Strain up to 5% AE (MJ/m3) | AE/TS (J/m3·Pa) | Spot Weldability | Bendability | Note |
|---|---|---|---|---|---|---|---|---|---|---|---|---|---|---|---|
| 22 | 0 | 18 | 82 | 0 | 0 | 5.3 | 2 | 38 | 912 | 1204 | 72 | 0.060 | Excellent | Excellent | Example |
| 23 | 0 | 10 | 90 | 0 | 0 | 16 | 0 | 43 | 846 | 1193 | 56 | 0.047 | Excellent | Poor | Comparative example |
| 24 | 0 | 17 | 83 | 0 | 0 | 5.5 | 2 | 22 | 919 | 1211 | 73 | 0.060 | Excellent | Poor | Comparative example |
| 25 | 0 | 28 | 72 | 0 | 0 | 3.3 | 6 | 35 | 928 | 1229 | 75 | 0.061 | Excellent | Excellent | Example |
| 26 | 0 | 26 | 74 | 0 | 0 | 3.5 | 5 | 9 | 926 | 1230 | 74 | 0.060 | Excellent | Poor | Comparative example |
| 27 | 0 | 29 | 71 | 0 | 0 | 3.3 | 5 | 18 | 919 | 1225 | 74 | 0.060 | Excellent | Poor | Comparative example |
| 28 | 0 | 6 | 94 | 0 | 0 | 3.0 | 0 | 34 | 971 | 1243 | 82 | 0.066 | Excellent | Excellent | Example |
| 29 | 0 | 10 | 90 | 0 | 0 | 4.8 | 0 | 39 | 960 | 1264 | 78 | 0.062 | Excellent | Excellent | Example |

TABLE 5-continued

| Steel Sheet No. | *Microstructure V(F) (%) | V(B) (%) | V(M) (%) | V(γ) (%) | Other (%) | d(Mb) (μm) | V(LM) (%) | *Hardness ΔHv | Tensile Property YS (MPa) | TS (MPa) | Absorbed Energy for Strain up to 5% AE (MJ/m3) | AE/TS (J/m3·Pa) | Spot Weldability | Bendability | Note |
|---|---|---|---|---|---|---|---|---|---|---|---|---|---|---|---|
| 30 | 0 | 13 | 87 | 0 | 0 | 4.1 | 1 | 36 | 959 | 1217 | 79 | 0.065 | Excellent | Excellent | Example |
| 31 | 0 | 21 | 79 | 0 | 0 | 3.6 | 3 | 42 | 910 | 1205 | 72 | 0.060 | Excellent | Excellent | Example |
| 32 | 0 | 7 | 93 | 0 | 0 | 4.0 | 0 | 40 | 962 | 1222 | 81 | 0.066 | Excellent | Excellent | Example |
| 33 | 0 | 5 | 95 | 0 | 0 | 5.5 | 0 | 42 | 938 | 1220 | 76 | 0.062 | Excellent | Excellent | Example |
| 34 | 0 | 11 | 89 | 0 | 0 | 6.0 | 0 | 39 | 850 | <u>1077</u> | 69 | 0.064 | Excellent | Excellent | Comparative example |
| 35 | 0 | 25 | 71 | <u>4</u> | 0 | 5.3 | 3 | 52 | 881 | 1382 | 51 | 0.037 | Poor | Poor | Comparative example |
| 36 | <u>13</u> | <u>53</u> | 31 | <u>3</u> | 0 | 2.3 | <u>21</u> | 38 | <u>701</u> | <u>996</u> | 42 | 0.042 | Excellent | Excellent | Comparative example |
| 37 | <u>13</u> | <u>52</u> | 35 | 0 | 0 | 2.2 | <u>23</u> | 38 | <u>688</u> | <u>1010</u> | 43 | 0.043 | Excellent | Excellent | Comparative example |
| 38 | 7 | <u>48</u> | 43 | <u>2</u> | 0 | 6.5 | <u>23</u> | 39 | <u>764</u> | <u>1119</u> | 46 | 0.041 | Excellent | Excellent | Comparative example |
| 39 | 0 | <u>52</u> | <u>48</u> | 0 | 0 | <u>16</u> | <u>26</u> | 36 | <u>749</u> | <u>1130</u> | 41 | 0.036 | Excellent | Poor | Comparative example |
| 40 | 7 | <u>50</u> | 43 | 0 | 0 | 6.3 | <u>22</u> | 40 | <u>763</u> | <u>1121</u> | 48 | 0.043 | Excellent | Excellent | Comparative example |
| 41 | 3 | 28 | 66 | <u>3</u> | 0 | 6.5 | <u>12</u> | 38 | 823 | 1205 | 51 | 0.042 | Excellent | Poor | Comparative example |
| 42 | 5 | 30 | 65 | 0 | 0 | 5.6 | <u>11</u> | 35 | 833 | 1183 | 54 | 0.046 | Excellent | Poor | Comparative example |

*V(F): area ratio of ferrite, V(B): area ratio of bainitic ferrite V(M): area ratio of martensite, V(γ): area ratio of retained austenite, Other: area ratio of phases othe than those described above, d(Mb): average grain diameter of martensite adjacent to bainite, V(LM): area ratio of martensite adjacent only to bainite
ΔHv: a value calculated by subtracting the Vickers hardness at a position located at 20 μm from the surface of the steel sheet from the Vickers hardness at a position located at 100 μm from the surface of the steel sheet It is clarified that the galvanized steel sheets and the galvannealed steel sheets according to aspects of the present invention had a TS of 1180 MPa or more, excellent anti-crash property indicated by an AE/TS of 0.050 or more, and excellent bending formability and spot weldability.

Therefore, according to the present invention, it is possible to obtain a galvanized steel sheet and a galvannealed steel sheet excellent in terms of spot weldability, anti-crash property, bending formability, and so forth, which has an excellent effect of contributing to weight reduction of an automobile and thereby significantly contributing to an increase in the quality of an automobile body.

According to the present invention, it is possible to obtain a high-strength galvanized steel sheet having a TS of 1180 MPa or more excellent in terms of spot weldability, anti-crash property, and bending formability. By using the high-strength galvanized steel sheet according to an embodiment of the present invention for automobile parts, it is possible to significantly contribute to weight reduction of an automobile, thereby contributing to an increase in the quality of an automobile body by contributing.

The invention claimed is:

1. A high-strength galvanized steel sheet having
a chemical composition containing, by mass %, C: 0.05% or more and 0.15% or less, Si: 0.01% or more and 1.00% or less, Mn: 1.5% or more and 4.0% or less, P: 0.100% or less, S: 0.02% or less, Al: 0.01% or more and 0.50% or less, Cr: 0.010% or more and 2.000% or less, Nb: 0.005% or more and 0.100% or less, Ti: 0.005% or more and 0.100% or less, B: 0.0005% or more and 0.0050% or less, and the balance being Fe and inevitable impurities, in which K, which is expressed by equation (1) below, is 3.0 or more and
a metallographic structure including, in terms of area ratio determined by performing structure observation at a position located at ¼ of the thickness in a cross section at a right angle to the surface of the steel sheet, ferrite: 10% or less, bainitic ferrite: 2% or more and 30% or less, and martensite: 60% or more and 98% or less, wherein the proportion of retained austenite determined by using an X-ray diffraction method is less than 2%, an average grain diameter of martensite adjacent to bainite is 15 μm or less, the proportion of massive martensite adjacent only to bainite to the whole metallographic structure is 10% or less, and a value (ΔHv) calculated by subtracting the Vickers hardness at a position located at 20 μm from the surface of the steel sheet from the Vickers hardness at a position located at 100 μm from the surface of the steel sheet is 30 or more:

$$K = -0.4 \times [Si] + 1.0 \times [Mn] + 1.3 \times [Cr] + 200 \times [B] \quad (1),$$

where, in equation (1) above, [Si] denotes the content [mass %] of Si, [Mn] denotes the content [mass %] of Mn, [Cr] denotes the content [mass %] of Cr, and [B] denotes the content [mass %] of B.

2. The high-strength galvanized steel sheet according to claim 1, wherein the steel sheet has the chemical composition further containing, by mass %, at least one chemical element selected from among Mo: 0.005% or more and 2.000% or less, V: 0.005% or more and 2.000% or less, Ni: 0.005% or more and 2.000% or less, and Cu: 0.005% or more and 2.000% or less.

3. The high-strength galvanized steel sheet according to claim 1, wherein the steel sheet has the chemical composition further containing, by mass %, at least one chemical element selected from among Ca: 0.001% or more and 0.005% or less and REM: 0.001% or more and 0.005% or less.

4. The high-strength galvanized steel sheet according to claim 1, wherein the galvanized steel sheet is a galvannealed steel sheet.

5. A method for manufacturing a high-strength galvanized steel sheet, the method comprising
   hot-rolling a slab having the chemical composition according to claim 1 by performing finish rolling in which a final finish rolling pass is performed with a rolling reduction of 10% or more at a temperature of 850° C. or higher and 950° C. or lower, then performing cooling so that the total retention time in a temperature range of 600° C. or higher and 700° C. or lower is 10 seconds or less, and coiling the cooled steel sheet at a temperature of 450° C. or higher and lower than 600° C.,
   following the hot rolling process, cold-rolling the hot-rolled steel sheet with a rolling reduction of more than 20%,
   following the cold rolling process, heating the cold-rolled steel sheet to an annealing temperature in an atmosphere having a dew point of −45° C. or higher and +20° C. or lower and an air ratio of 0.80 or more at an average heating rate of 0.5° C./s or more in a temperature range of 300° C. or higher and equal to or lower than the annealing temperature, which is a temperature in a temperature range of (Ac3-20° C.) or higher and 950° C. or lower, and holding the heated steel sheet at the annealing temperature for 10 seconds or more and 1000 seconds or less,
   cooling the annealed cold-rolled steel sheet at an average cooling rate of 5° C./s or more to a cooling stop temperature, which is a temperature in a temperature range of 450° C. or higher and 550° C. or lower, and holding the cooled steel sheet at the cooling stop temperature for 30 seconds or more and 1000 seconds or less, and
   galvanizing the cooled cold-rolled steel sheet.

6. A method for manufacturing a high-strength galvanized steel sheet according to claim 5, the method further comprising performing an alloying treatment on the high-strength galvanized steel sheet.

7. The high-strength galvanized steel sheet according to claim 2, wherein the steel sheet has the chemical composition further containing, by mass %, at least one chemical element selected from among Ca: 0.001% or more and 0.005% or less and REM: 0.001% or more and 0.005% or less.

8. The high-strength galvanized steel sheet according to claim 2, wherein the galvanized steel sheet is a galvannealed steel sheet.

9. The high-strength galvanized steel sheet according to claim 3, wherein the galvanized steel sheet is a galvannealed steel sheet.

10. The high-strength galvanized steel sheet according to claim 7, wherein the galvanized steel sheet is a galvannealed steel sheet.

11. The high-strength galvanized steel sheet according to claim 1, wherein the steel sheet has a tensile strength of 1180 MPa or more, as determined by JIS Z 2201.

12. The high-strength galvanized steel sheet according to claim 1, wherein the steel sheet has an anti-crash property indicated by AE/TS of 0.050 or more.

13. A method for manufacturing a high-strength galvanized steel sheet, the method comprising
   hot-rolling a slab having the chemical composition according to claim 2 by performing finish rolling in which a final finish rolling pass is performed with a rolling reduction of 10% or more at a temperature of 850° C. or higher and 950° C. or lower, then performing cooling so that the total retention time in a temperature range of 600° C. or higher and 700° C. or lower is 10 seconds or less, and coiling the cooled steel sheet at a temperature of 450° C. or higher and lower than 600° C.,
   following the hot rolling process, cold-rolling the hot-rolled steel sheet with a rolling reduction of more than 20%,
   following the cold rolling process, heating the cold-rolled steel sheet to an annealing temperature in an atmosphere having a dew point of −45° C. or higher and +20° C. or lower and an air ratio of 0.80 or more at an average heating rate of 0.5° C./s or more in a temperature range of 300° C. or higher and equal to or lower than the annealing temperature, which is a temperature in a temperature range of (Ac3-20° C.) or higher and 950° C. or lower, and holding the heated steel sheet at the annealing temperature for 10 seconds or more and 1000 seconds or less,
   cooling the annealed cold-rolled steel sheet at an average cooling rate of 5° C./s or more to a cooling stop temperature, which is a temperature in a temperature range of 450° C. or higher and 550° C. or lower, and holding the cooled steel sheet at the cooling stop temperature for 30 seconds or more and 1000 seconds or less, and
   galvanizing the cooled cold-rolled steel sheet.

14. A method for manufacturing a high-strength galvanized steel sheet, the method comprising
   hot-rolling a slab having the chemical composition according to claim 3 by performing finish rolling in which a final finish rolling pass is performed with a rolling reduction of 10% or more at a temperature of 850° C. or higher and 950° C. or lower, then performing cooling so that the total retention time in a temperature range of 600° C. or higher and 700° C. or lower is 10 seconds or less, and coiling the cooled steel sheet at a temperature of 450° C. or higher and lower than 600° C.,
   following the hot rolling process, cold-rolling the hot-rolled steel sheet with a rolling reduction of more than 20%,
   following the cold rolling process, heating the cold-rolled steel sheet to an annealing temperature in an atmosphere having a dew point of −45° C. or higher and +20° C. or lower and an air ratio of 0.80 or more at an average heating rate of 0.5° C./s or more in a temperature range of 300° C. or higher and equal to or lower than the annealing temperature, which is a temperature in a temperature range of (Ac3-20° C.) or higher and 950° C. or lower, and holding the heated steel sheet at the annealing temperature for 10 seconds or more and 1000 seconds or less,
   cooling the annealed cold-rolled steel sheet at an average cooling rate of 5° C./s or more to a cooling stop temperature, which is a temperature in a temperature range of 450° C. or higher and 550° C. or lower, and holding the cooled steel sheet at the cooling stop temperature for 30 seconds or more and 1000 seconds or less, and
   galvanizing the cooled cold-rolled steel sheet.

15. A method for manufacturing a high-strength galvanized steel sheet, the method comprising
   hot rolling a slab having the chemical composition according to claim 7 by performing finish rolling in which a final finish rolling pass is performed with a rolling reduction of 10% or more at a temperature of 850° C. or higher and 950° C. or lower, then performing cooling so that the total retention time in a temperature range of 600° C. or higher and 700° C. or lower is 10 seconds or less, and coiling the cooled steel sheet at a temperature of 450° C. or higher and lower than 600° C., following the hot rolling process, cold-rolling the hot-rolled steel sheet with a rolling reduction of more than 20%, following the cold rolling process, heating the cold-rolled steel sheet to an annealing temperature in an atmosphere having a dew point of −45° C. or higher and +20° C. or lower and an air ratio of 0.80 or more at an average heating rate of 0.5° C./s or more in a temperature range of 300° C. or higher and equal to or lower than the annealing temperature, which is a temperature in a temperature range of (Ac3-20° C.) or higher and 950° C. or lower, and holding the heated steel sheet at the annealing temperature for 10 seconds or more and 1000 seconds or less, cooling the annealed cold-rolled steel sheet at an average cooling rate of 5° C./s or more to a cooling stop temperature, which is a temperature in a temperature range of 450° C. or higher and 550° C. or lower, and holding the cooled steel sheet at the cooling stop temperature for 30 seconds or more and 1000 seconds or less, and galvanizing the cooled cold-rolled steel sheet.

16. A method for manufacturing a high-strength galvanized steel sheet according to claim 13, further comprising performing an alloying treatment on the high-strength galvanized steel sheet.

17. A method for manufacturing a high-strength galvanized steel sheet according to claim 14, further comprising performing an alloying treatment on the high-strength galvanized steel sheet.

18. A method for manufacturing a high-strength galvanized steel sheet according to claim 15, further comprising performing an alloying treatment on the high-strength galvanized steel sheet.

* * * * *